United States Patent
Ting

(10) Patent No.: US 6,428,890 B1
(45) Date of Patent: Aug. 6, 2002

(54) POLYMER MATRIX COMPOSITE AND METHOD FOR MAKING THE SAME

(75) Inventor: Jyh-Ming Ting, Taipei (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 09/878,079

(22) Filed: Jun. 7, 2001

(51) Int. Cl.⁷ .................................................. D02G 3/00
(52) U.S. Cl. ........................ 428/361; 428/368; 428/375; 428/378; 428/403; 428/297.4
(58) Field of Search ................................. 428/404, 403, 428/368, 285, 297.4, 361, 375, 378; 264/29.3, 109; 156/89.26; 427/249, 255.1, 215, 419.1

(56) References Cited

U.S. PATENT DOCUMENTS 5,585,165 A  * 12/1996  Kennedy et al. ............ 428/212
5,814,408 A  *  9/1998  Ting et al. .................. 428/408
5,837,081 A  * 11/1998  Ting et al. ................ 156/89.26

\* cited by examiner

*Primary Examiner*—Merrick Dixon
(74) *Attorney, Agent, or Firm*—Snell & Wilmer L.L.P.

(57) ABSTRACT

A polymer matrix composite is provided including graphitized vapor grown carbon fiber mats. A mat comprises semi-continuous vapor grown carbon fiber. The preferred method of producing the composite includes the steps of providing at least one mat of vapor grown carbon fiber and infiltrating liquidized polymeric material into the interstices of the mat by a hot press process. The resulting polymer matrix composite has a thermal conductivity between 400 W/m-K and 700 W/m-K, a density between 1.10–1.40/cc, and an insulating surface, and is useful as a component it electronic devices, aircraft, spacecraft, portable electronics, and other thermal management applications.

11 Claims, 3 Drawing Sheets

POLYMER MATRIX COMPOSITE AND METHOD FOR MAKING THE SAME

FIELD OF THE INVENTION

The present invention relates to a polymer matrix composite useful in thermal management applications and to a method for making such a composite.

BACKGROUND OF THE INVENTION

Composite materials are well known for use in structural applications. In recent years, composites have also become desirable for use in thermal management applications. For example, composites have been found to be useful for heat dissipation in electronic packaging. Typical composites for electronic packaging components exhibit coefficients of thermal expansion, which may be tailored by varying the architecture of reinforcing agents. Such reinforcing agents may include conventional carbon fibers, silicon carbide particles, boron nitride particles, titanium nitride particles, and diamond particles. The resulting composite materials have not shown substantial improvements in thermal conductivity. More recently, vapor grown carbon fibers have been studied for use in thermal management applications. Such fibers are grown through the pyrolysis of hydrocarbon gas in the presence of a metal catalyst. Vapor grown carbon fibers have a higher thermal conductivity than any other carbon fiber and may be produced at a lower cost. Vapor grown carbon fibers also exhibit the highest degree of graphitic perfection of any known carbon fiber.

An aluminum matrix composite and a carbon matrix composite have been fabricated from this type of carbon fiber and exhibit high thermal conductivity, as taught in Ting, U.S. Pat. No. 5,814,408. However, these two composites are electrically conductive which is not desired in many applications. Furthermore, fabrication of the aluminum matrix composite requires a temperature higher than the aluminum solidus, which is about 660° C. or 1220° F., a high pressure to cast the molten aluminum, and a protective environment to prevent the oxidation of aluminum. Fabrication of the carbon matrix composite also requires a temperature higher than 1100° C. or 2012° F., and a reduced pressure. A prefrom is needed for making either the aluminum matrix composite or carbon matrix composite. Further, separate heating of matrix and preform is required for aluminum matrix composite and often required for carbon matrix composite. All these add to production costs.

Accordingly, there is still a need in the art for improved composites for use in thermal management applications which not only exhibit high thermal conductivity but also provide electrically insulating surfaces, a low density, and may be produced at lower cost.

SUMMARY OF THE INVENTION

It is an objective of the present invention to provide a polymer matrix composite having high thermal conductivity while having an insulating surface and low density.

It is another objective of the present invention to provide a method for preparing the polymer matrix composite perfectly suitable for use in thermal management applications.

The present invention meets that need for use in thermal management applications by providing a polymer matrix composite, which has high thermal conductivity, a low density, and an electrically insulating surface. The preparation of the polymer matrix composite requires only atmospheric environment and without the use of a preform. The polymer matrix composite of the invention may especially be used in a variety of thermal management applications where electric insulation and low density are preferable.

The polymer matrix composite of the present invention is formed from a stack of in-situ interwoven, graphitized vapor grown carbon fiber (VGCF) mats, eliminating the fabrication of a preform.

In accordance with one embodiment of the invention, a polymer matrix composite is provided which comprises at least one interwoven mat of graphitized vapor grown carbon fibers. The mat includes interstices therein which have been infiltrated with polymeric material.

Preferably, the mats are comprised of semi-aligned, semi-continuous vapor grown carbon fibers, which have been interwoven in situ during growth. The fibers are also preferably graphitized, i.e., they are heat treated at a temperature of about 2600° C. or higher to convert a portion of the carbon contained in the fibers to graphitic carbon.

Preferably, the room temperature thermal conductivity of the vapor grown carbon fiber mat of the present invention is about 1500 W/m-K and above, which leads to a polymer matrix composite having a thermal conductivity above 400 W/m-K.

A method of making the polymer matrix composite is also provided which generally comprises the steps of providing at least one interwoven mat of graphitized vapor grown carbon fibers and infiltrating the interstices of the stack with liquidized polymeric material.

Preferably, the mat is infiltrated with polymeric material by a hot press technique in which both the polymeric material and the mat are heated at the same time to a temperature only slightly above the melting temperature of the polymeric material. When the temperature of the polymeric material and mat reaches the state, pressure is applied so that infiltration is initiated in the atmospheric environment.

The method of the present invention is cost-effective and efficient as the use of polymeric materials. The method eliminates the need of high temperature, preform, protective environment, reduced or high atmospheric pressure, and separate heating. In addition, the use of vapor grown carbon fiber mats eliminates the need to mechanically weave individual grown fibers into a mat prior to their use in the composite.

Such a hot press technique allows a useful range of fiber loading, i.e., from 10 volume percent to 60 volume percent, and either unidirectional or in-plane orthogonal (two-directional) fiber architecture without resulting in inhomogeneous infiltration. This enables the coefficient of thermal expansion and other properties of the composite to be controlled over a wider range and therefore increases the number of applications in which the resulting composites can be used.

In addition, the resulting polymer matrix composite exhibits a higher thermal conductivity than composites reinforced with any other carbon fibers.

Further, the resulting polymer matrix composite has a lower density than any other composite for use in thermal management.

The polymer matrix composite may be used in many thermal management applications including aircraft, spacecraft, electronic devices, and portable electronics.

Accordingly, it is a feature of the present invention to provide a polymer matrix composite formed from interwoven vapor grown carbon fiber mats, which exhibit high thermal conductivity, low density, and variable coefficient of thermal expansion. It is a further feature of the present invention to provide a cost-effective method of producing such a polymer matrix composite. These, and other features and advantages of the invention will become apparent to those skilled in the art after comprehending the following detailed description, the accompanying drawings, and the appended claims.

DETAILED DESCRIPTION OF THE PREFERRED EMBODIMENT

The vapor grown carbon fiber-reinforced matrix composite of the present invention provides many advantages over composites, which use other matrix materials, such as aluminum, and reinforcing agents, such as conventional carbon fibers. For example, the use of polymer matrix requires a much lower processing temperature, and no protective environment and reduced or high atmospheric pressure. In addition, the use of a stack of mats eliminates the fabrication of a preform. Also, the vapor grown carbon fiber mat has the highest thermal conductivity among all carbon fibers, which in turn results a high thermal conductivity for the resultant composite. Further, while other carbon fibers must be mechanically interwoven prior to be used in a composite, the vapor grown carbon fiber mats of the present invention consist of semi- continuous fibers, which are interwoven in situ during growth.

Accordingly, the polymer matrix composite of the present invention may be produced at much lower cost than conventional composites. The polymer matrix composite comprises a stack of interwoven mats of graphitized vapor grown carbon fibers. It should be appreciated that the composite may have a number of different shapes depending on its desired end use.

Figure 1:
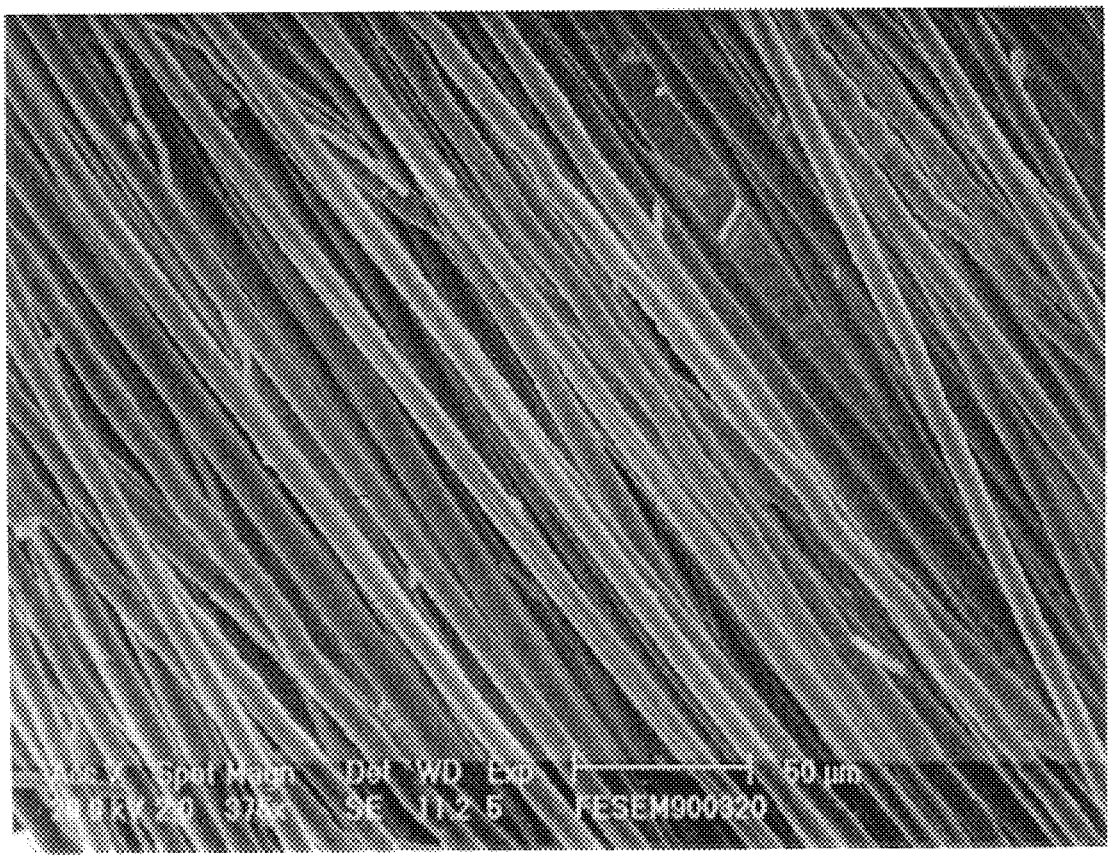
FIG. 1A is a photomicrograph illustrating the mat of the present invention showing the orientations of vapor grown carbon fibers.

The mats consist of semi-aligned, semi-continuous vapor grown carbon fibers as illustrated in FIG. 1. In a mat, most of the fibers have the same orientation, while some exhibit different degrees of mis-orientation. The orientation and weaving of the fibers in the mat may be controlled by gas flow conditions during fiber growth.

It should be appreciated that the number of mats contained in the stack may vary depending on the desired dimensions and on the desired end use for the resultant composite. The dimensions of the individual mats may also be varied as desired.

The vapor grown carbon fiber mat is preferably grown on a substrate, which has been seeded with iron particles or been placed near an iron seeded substrate. The substrate is placed in a reactor and a flowing gas mixture of hydrocarbon and hydrogen is introduced at a temperature of about 1000° C. . The hydrocarbon is preferably methane. Fibers become intertwined during the growth as directed by the gas streamlines which are crossing each other. As a result, the fibers thicken during the growth process, causing junctions to form between the interwoven fibers. Mats of fibers are thus formed.

Figure 2A:
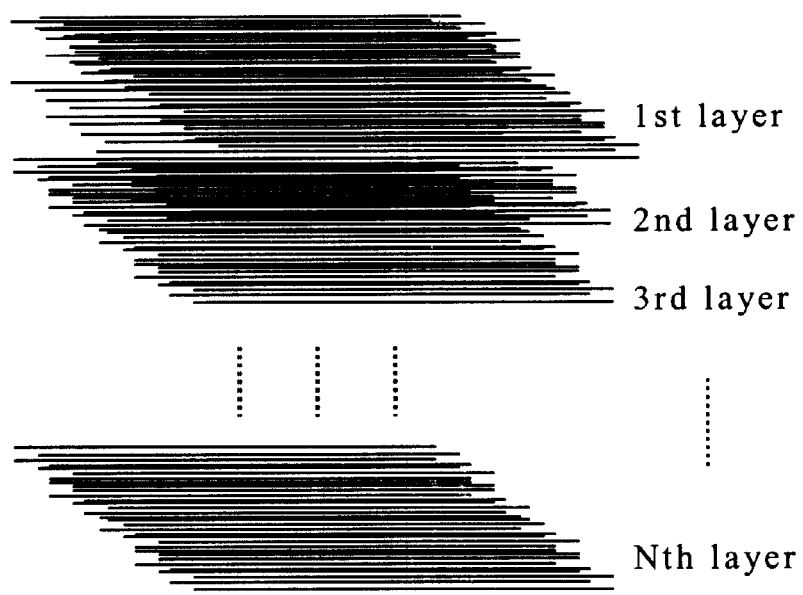
FIG. 2A is a illustration of a stack with unidirectional fiber architecture.
Figure 2B:
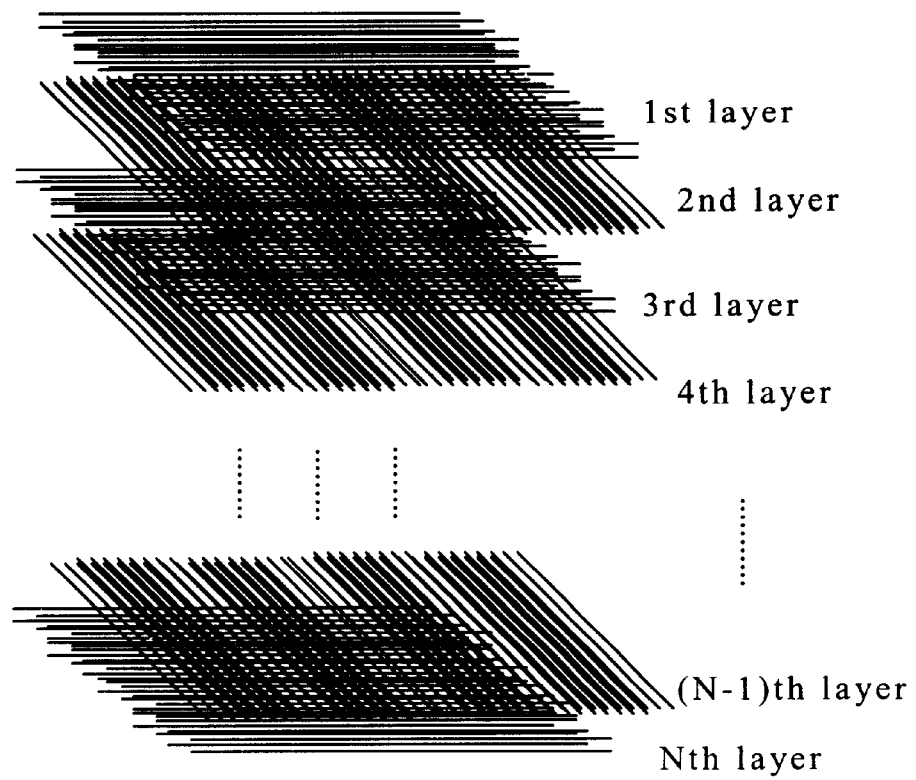
FIG. 2B is a illustration of a stack with an in-plane orthogonal fiber architecture.

The vapor grown fiber mats produced from this process are then graphitized by heat treatment in an inert gas to a temperature of 2600° C. A stack is prepared from graphitized interwoven mats simply by piling up of a desired amount of the mats, as illustrated in FIGS. 2A and 2B for a unidirectional fiber architecture and an in-plane orthogonal fiber architecture, respectively.

Figure 3A:
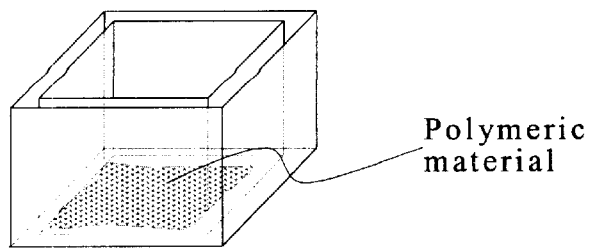
FIG. 3A is a schematic of the open mold, with polymeric material placed in the bottom, of the present invention.
Figure 3B:
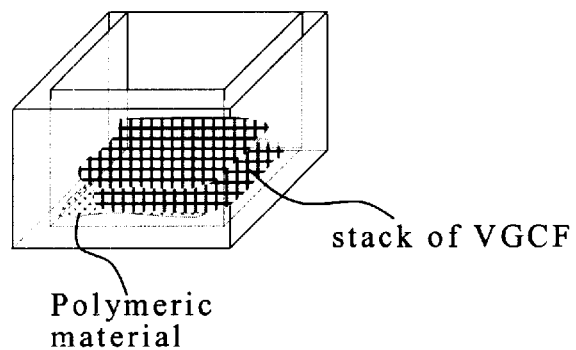
FIG. 3B is a schematic of the open mold, with polymeric material placed in the bottom and a stack of vapor grown carbon fiber mats on top of the polymeric material, of the present invention.
Figure 3C:
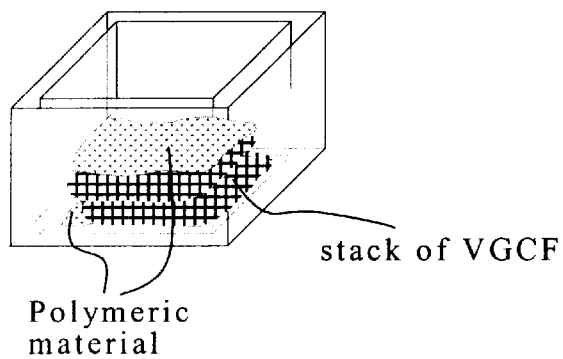
FIG. 3C is a schematic of the open mold, with polymeric material placed in the bottom, a stack of vapor grown carbon fiber mats in the middle, and another polymeric material on the top, of the present invention.

Fabrication of polymer matrix composite is accomplished by a hot press method. The process includes the placement of desired amount of polymeric material into an open mold (FIG. 3A). A stack with a desired amount of fiber mats, which have desired dimensions and fiber orientation(s), is subsequently placed on top of the polymeric material (FIG. 3B). This is followed by another addition of polymeric material on top of the stack (FIG. 3C). The mold, with a sandwiched polymeric material and fiber stack (FIG. 3C), is then closed with a mold cover and heated to a temperature slightly above the melting point of the polymeric material. Orthogonal pressure is then applied to the mold cover when the temperature is reached, causing infiltration of molten polymeric material to occur.

The orthogonal pressure is preferably in the range of from about 1 atm to 70 atm. It should be appreciated that the temperature and pressures required to carry out the infiltration may vary depending on the particular polymeric material being used and the characteristic of the stack. The mold is then cooled whereupon the polymeric material re-solidifies. Thereafter, the polymer matrix is removed from the mold.

It should be thus noted that the stacking sequence may be varied. The polymeric material and the mats of the graphitized vapor grown carbon fiber may be put in the mold with every single mat interlaying two coats of the polymeric material. Any stacking sequence that facilitates homogeneous distribution of the polymeric material in the mats should be considered as within the scope of the appended claims.

For the production of thicker polymer matrix composites, this process may be executed more than one time before the mold and its contents is heated and pressurized.

The resultant polymer matrix composite may exhibit a thermal conductivity of between about 400–70W/m-K after infiltration. The polymer matrix composites of the present invention are especially suited for use in electronic devices and packaging, in aircraft, spacecraft, and portable electronics.

The following example is for purpose of illustrating the present invention. The example is not to be considered as limiting the scope of the claims appended hereto.

EXAMPLE 1

Epoxy matrix composites were prepared in accordance with the present invention. First, vapor grown carbon fiber mats were grown and removed from the reactor. The as-grown mats were then heat treated (graphitized) at 2600° C. in an argon atmosphere. Smaller mats with dimension of 5 cm by 10 cm were cut from the graphitized, larger mats and formed into stacks. The stacks were then placed into a mold, which was pre-loaded with desired amounts of epoxy. This was followed by another addition of epoxy on top of the stack (FIG. 3C). The mold was then closed and heated to 180° C. Pressure of between 1 atm to 70 atm was applied when the temperature was reached, causing infiltration of epoxy to occur. The mold was then cooled and the resultant epoxy matrix composites were removed from the mold.

Seven composites were formed according to this method. The results are shown below in Table 1. As can be seen, the use of the vapor grown carbon mats greatly increases the thermal conductivity of epoxy, which has a thermal conductivity of slightly less than 0.1 W/m-K.

More than a 200,000% increase in thermal conductivity over neat epoxy was achieved by using less than 14 fiber volume percent of vapor grow carbon fiber.

TABLE 1

| Vf (%) | Architecture | Density (g/cc) | Porosity (%) | Conductivity (W/m-K) X* | Conductivity (W/m-K) Y* | CTE (ppm/K) X* |
|---|---|---|---|---|---|---|
| 14 | 1D | 1.27 | 3.5 | 198 | 3.9 | |
| 21 | 1D | 1.31 | 4.1 | 291 | 5 | 5.36 |
| 28 | 1D | 1.31 | 7.8 | 396 | 8.3 | |
| 35 | 1D | 1.38 | 6.7 | 490 | 14.3 | 1.61 |
| 46 | 1D | 1.41 | 10.3 | 633 | 25 | |
| | 2D | 1.40 | 11.0 | 347 | 355 | |
| 56 | 1D | 1.48 | 10.9 | 695 | 36 | −0.11 |

In this Table. 1, X represents the primary fiber direction and Y is in-plane normal to X. Vf denotes the volume fraction of vapor grown carbon fibers. 1D and 2D denote one dimension (unidirectional) and two dimension (two-directional), respectively. The conductivity in Table. 1 represents thermal conductivity. CTE is the coefficient of thermal expansion.

Note that the density of the polymer matrix composite is approximately 1.2 to 1.4 g/cc, which is about half of the density of the aluminum matrix composite disclosed in U.S. Pat. No. 5,814,408. A lower density, which implies a light weight, is generally favorable in almost all mobile devices.

Although in the example above epoxy resin is adopted as the polymeric material for the polymer matrix composite, it should be understood that adoption of other polymeric materials will be apparent and intuitive to those skilled in the art after comprehending the descriptions and related drawings. All exemplary embodiments and details have been shown for purpose of illustrating the invention. It will be apparent to those skilled in the art that various changes and equivalent permutations in the methods and materials disclosed herein may be made without departing from the scope of the invention, which is defined in the appended claims.

What is claimed is:

1. A polymer matrix composite comprising:
    at least one mat of graphitized vapor grown carbon fibers, said mat having interstices therein; and
    a polymeric material;
    wherein said interstices of said mat are infiltrated with said polymeric material.

2. The polymer matrix composite of claim 1, wherein said graphitized vapor grown carbon fibers are interwoven in situ during growth.

3. The polymer matrix composite of claim 1, wherein said graphitized vapor grown carbon fibers exhibit a thermal conductivity above 1500W/m-K at room temperature.

4. The polymer matrix composite of claim 1, has a thermal conductivity above 400W/m-K.

5. The polymer matrix composite of claim 1, wherein said graphitized vapor grown carbon fibers are at least partially semi-aligned, semi-continuous to form said mat.

6. The polymer matrix composite of claim 1, wherein said graphitized vapor grown carbon fibers have been graphitized by heat treatment at a temperature above 2600° C.

7. A method for making a polymer matrix composite comprising the steps of:
    providing at least one mat of graphitized vapor grown carbon fibers, said mat having interstices therein; and
    physically infiltrating said interstices with a polymeric material at a temperature above the melting temperature of said polymeric material.

8. The method of claim 7, wherein said graphitized vapor grown carbon fibers are interwoven in situ during growth.

9. The method of claim 7, wherein said graphitized vapor grown carbon fibers are at least partially semi-aligned, semi-continuous.

10. The method of claim 7, wherein in the step of infiltrating said interstices comprises the steps of:
    placing said mat into a mold preloaded with said polymeric material;
    adding said polymeric material to said mold over said mat;
    closing said mold with a mold cover;
    heating said closed mold to a temperature above the melting temperature of said polymeric material; and
    applying orthogonal pressure to said mold cover.

11. A method for making a polymer matrix composite comprising the steps of
    providing at least one mat of interwoven, graphitized vapor grown carbon fibers, said mat having interstices therein;
    placing said mat into a mold preloaded with a polymeric material;
    adding said polymeric material to said mold over said mat;
    closing said mold with a mold cover;
    heating said closed mold to a temperature above the melting temperature of said polymeric material; and
    applying orthogonal pressure to said mold cover.

* * * * *